United States Patent [19]

Yamasaki

[11] Patent Number: 4,800,449
[45] Date of Patent: Jan. 24, 1989

[54] DAT RECORDER WITH AUTOMATIC CASSETTE MOVEMENT

[75] Inventor: Hidenori Yamasaki, Nagaokakyo, Japan

[73] Assignee: Mitsubishi Denki Kabushiki Kaisha, Tokyo, Japan

[21] Appl. No.: 901

[22] Filed: Jan. 6, 1987

[30] Foreign Application Priority Data

Jan. 21, 1986 [JP] Japan .................................. 61-11595

[51] Int. Cl.$^4$ ......................................... G11B 15/675
[52] U.S. Cl. .................................................... 360/71
[58] Field of Search ....................... 360/96.5, 96.6, 71, 360/85

[56] References Cited

U.S. PATENT DOCUMENTS 3,758,119  9/1973  Harlan ................................... 360/71
3,758,121  9/1973  Walsh .................................... 360/71

Primary Examiner—Robert S. Tupper
Attorney, Agent, or Firm—Sughrue, Mion, Zinn, Macpeak and Seas

[57] ABSTRACT

A rotary head type recording and reproducing device in which a magnetic tape cassette inserted through a slot of the device is positioned therein in any of an ejection position, an unloaded position, and a loaded position where a recording or reproducing operation of the device is performed. An unloading device is provided which functions to automatically move the cassette from the loaded position to the unloaded position when the operation of the device is terminated with the cassette being held in the loaded position, so that the magnetic tape in the cassette can be protected against dust.

4 Claims, 6 Drawing Sheets

DAT RECORDER WITH AUTOMATIC CASSETTE MOVEMENT

BACKGROUND OF THE INVENTION

The present invention relates to a digital recording and reproducing device of a rotary head type (referred to as DAT recorder, hereinafter) and, particularly, to such device in which a cassette is loaded thereto by using the so-called slot-in mechanism and which is equipped with a mechanism for reliably holding the cassette therein during a time for which the device is not operated so that dust or the like is prevented from invading thereinto.

An outer configuration and an inner construction of a cassette for use in such DAT recorder have been standardized. FIGS. 1A and 1B show, in perspective, a top and a bottom of such cassette, respectively. In FIGS. 1A and 1B, the cassette 10 comprises a lower shell 101, an upper shell 102, a slider 103, mounted on the lower shell 101 slidably therealong, a lid 104 for exposing a magnetic tape in the cassette when the slider 103 is retracted, a loading grip 105 for holding the cassette in desired positions in the DAT device, a pair of notches 106 for unlocking a pair of slider locks 113 to allow the slider 103 to be retracted when the cassette is inserted into the DAT device, and a pair of notches 107 for retracting the slider 103 when the cassette is inserted correctly. A pair of holes 108 are provided in a bottom rear surface of the lower shell 101 for identification of the cassette and a hole 109 is also formed in the bottom rear surface of the lower shell 101 for preventing the erroneous erasure of the contents of the tape memory. A pair of data holes 110 are provided as shown.

A pair of hub holes 111 are provided in a middle portion of the lower shell 101 which are usually covered by the slider 103 having corresponding hub holes which, when the slider 103 is retracted, overlap with the hub holes 111 to allow tape reels in the cassette to be engaged with reel shafts of the DAT device, respectively. The movement of the slider 103 is usually prevented by the slider locks 113 as mentioned above.

The cassette further comprises a lid lock 112 formed on an upper face of a front end of the slider 103 for restricting the motion of the lid 104.

The lid 104 is hinged to the upper shell 102 and kicked up by a pin 14 or the like from a position shown by dotted line in FIG. 2A to that shown in FIG. 2B after the slider 103 is retracted, to provide an opening at a front end of the cassette through which the magnetic tape therein can contact with a rotary head of the DAT device.

That is, in order to open the lid 104, the cassette 10 in a position i has to be moved to a position ii and lowered with respect to the pin 14 provided stationarily in the DAT device, as shown in FIG. 3, or vice versa. Therefore, after the cassette 10 is inserted into the DAT device along a horizontal plane through a slot 20 in a front wall of the DAT device which is covered by a hinge cover 40 and passes through the position ii, it is usually lowered to open the lid and to receive the reel shafts 60 in the hub holes 111, so that the magnetic tape 113 can be in contact with the rotary head 51 mounted on a cylinder 50 as shown. Alternatively, it is possible to move an associated mechanism including the cylinder 50 of the DAT device upwardly to the cassette which is supported stationarily in the DAT device. In the latter case, however, the mechanical structure may become more complicated.

In the following description, positions i, ii and iii of the cassette 10 in the DAT device, shown in FIG. 3, are defined as an ejection position, an unloaded position in which a driving connection of the DAT device with the cassette 10 is not established while the lid 104 thereof is kept closed, and a loaded position in which a recording or reproducing operation of the DAT device is to be performed, respectively, for simplicity of description.

When the recording or reproducing operation of the DAT device is stopped for some reason while the cassette is held in the loaded position iii, the cassette is usually kept in that position as it is. This may provide no problem so long as the DAT device is stationary. However, when the DAT device is of a portable type or is mounted on a vehicle, it may be subjected to externally produced vibrations under which the tension of the magnetic tape of the cassette in the loaded position is varied, causing a breakage or a looping thereof which leads to a tangling of the tape. Further, in the loaded position in which the lid of the cassette is opened, dust may enter through the opening into the cassette. Such dust on the tape and/or the rotary head may degrade the operational performance of the DAT device for high density recording and reproducing, considerably. Therefore, the cassette should be held in the DAT device with the lid of the cassette and the slot cover of the DAT device being kept closed.

SUMMARY OF THE INVENTION

An object of the present invention is to provide a digital recording and reproducing device having a rotary magnetic head in which, when an operation of the device is stopped with a cassette being held in a loaded position within the device, the cassette is moved automatically to the unloaded position where the lid of the cassette is closed, to thereby eliminate the disadvantages inherent to the conventional device of this type.

The digital recording and reproducing device according to the present invention is featured by means for detecting a stoppage of a recording or reproducing operation of the device when the cassette is in the loaded position and means responsive to a detection of the stoppage of the operation for moving the cassette to the unloaded position, such that the lid of the cassette is kept closed. Since, in the unloaded position, the cover flap of the slot of the device through which the cassette had been inserted thereinto is also closed, the interior of the device can be dust-proof. Further, in the unloaded position, the magnetic tape is kept within the cassette and thus no external force is applied thereto. This may be effective to prevent a possible adhesion of the magnetic tape to the rotary head when ambient humidity is high.

DETAILED DESCRIPTION OF THE PREFERRED EMBODIMENTS

The present invention is associated with a cassette loading mechanism and a microcomputer controlled sequence. Particularly, the cassette loading mechanism must be capable of reliably holding a cassette in the unloaded position. In order to move the cassette between the loaded position and the unloaded position either the cassette or a mechanism including the cylinder must be moved vertically relatively to each other.

Figure 1A:
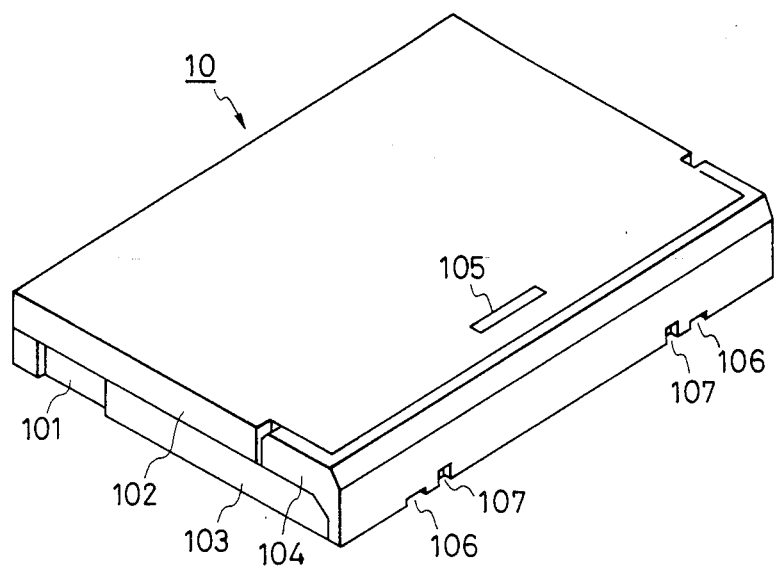
FIGS. 1A and 1B are perspective top and bottom views of a tape cassette for use in the DAT recording and reproducing device, respectively.
Figure 1B:
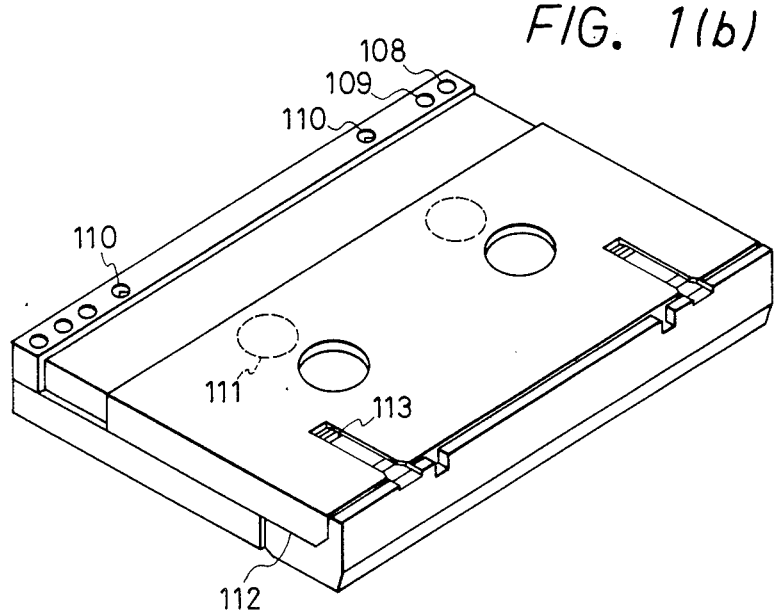
Figure 2A:
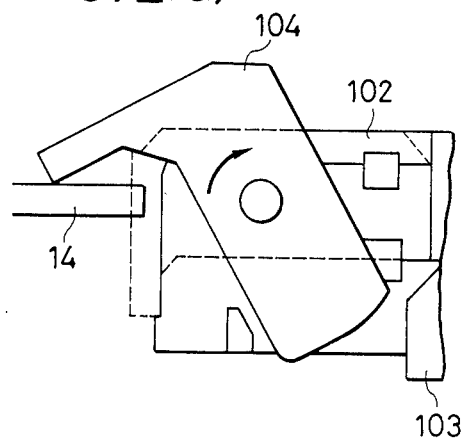
FIGS. 2A and 2B are schematic side views of a lid of the cassette showing positions of the lid, respectively.
Figure 2B:
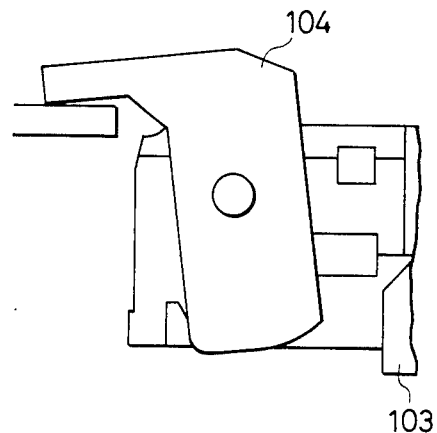
Figure 3:
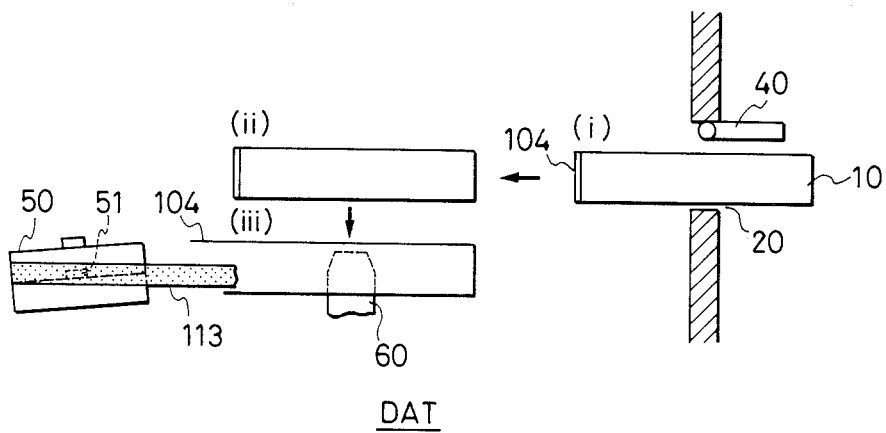
FIG. 3 illustrates a cassette loading in the slot-in type DAT device.
Figure 4:
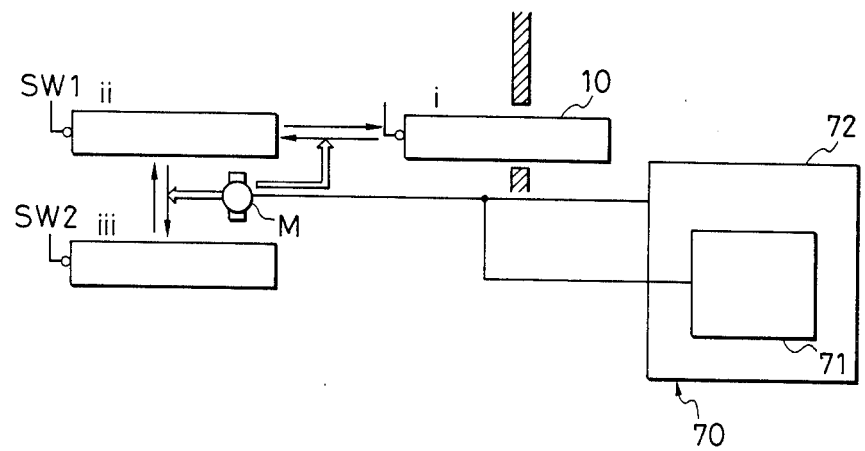
FIG. 4 illustrates an embodiment of the present invention.
Figure 5:
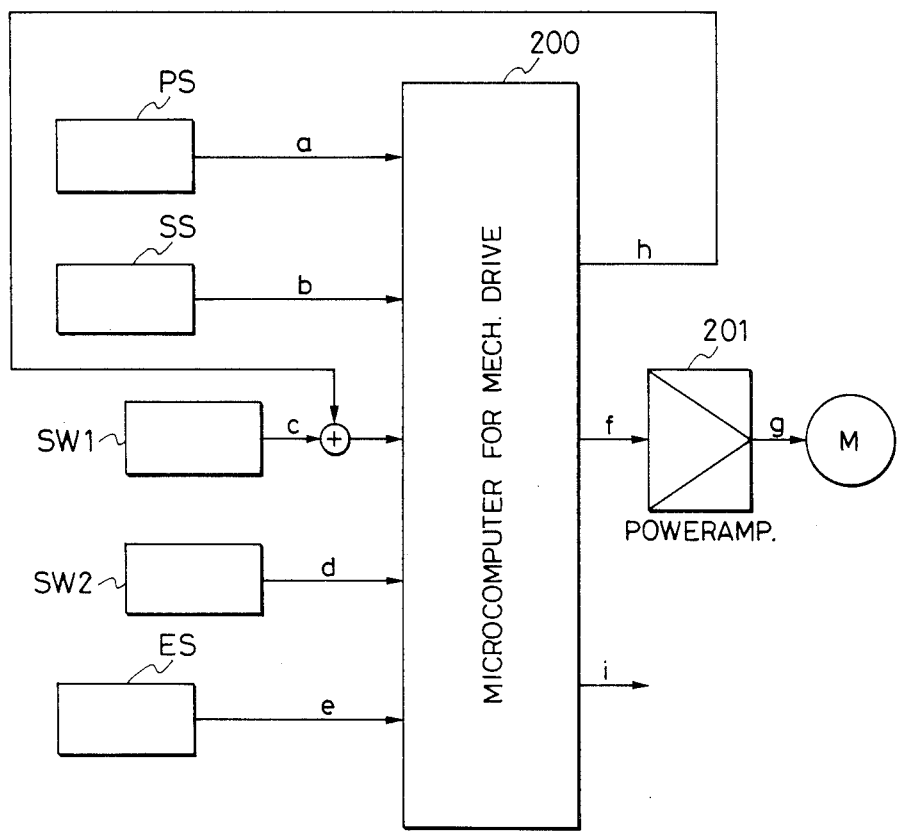
FIG. 5 is a block circuit diagram of a drive control circuit of a motor to be used in the system shown in FIG. 4.

In FIG. 4 which shows an embodiment of the cassette loading mechanism according to the present invention, the cassette 10 is driven by a motor M between the ejection, unloaded and loaded positions under the control of a microcomputer 200 (FIG. 5). The DAT device shown in FIG. 4 comprises switches SW1 and SW2 which, when closed, provide signals indicative of the cassette in the unloaded position and in the loaded position, respectively, and a main power supply 70 including a power source 71 for the DAT and a backup power source 72 for the motor M.

Figure 7:
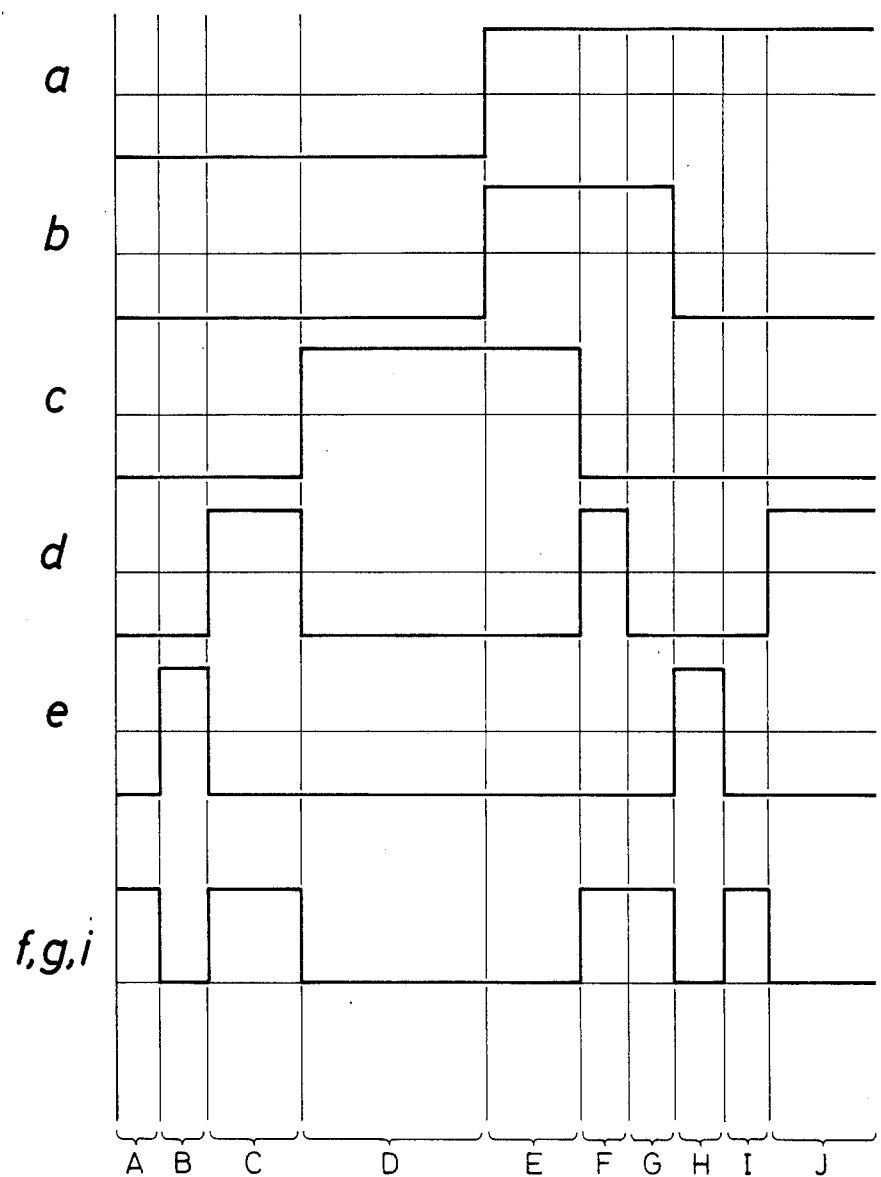
FIG. 7 shows waveforms at various points in the circuit shown in FIG. 5.

A control circuit for the motor M is shown in FIG. 5, which comprises the microcomputer 200 for controlling various mechanisms of the DAT device and a power amplifier 201 for amplifying a control signal from the microcomputer 200 and driving the motor M according thereto. The microcomputer 200 is associated with the switches SW1 and SW2, a power switch PS, a stop switch SS and an ejection switch ES of the DAT device. That is, the microcomputer responds to output signals of the switches SW1, SW2, PS, SS and ES to supply the control signals to the power amplifier 201 and a main power source control circuit (not shown). Waveforms of these output signals of the switches and of the control signals from the microcomputer 200 are shown in FIG. 7.

Figure 6:
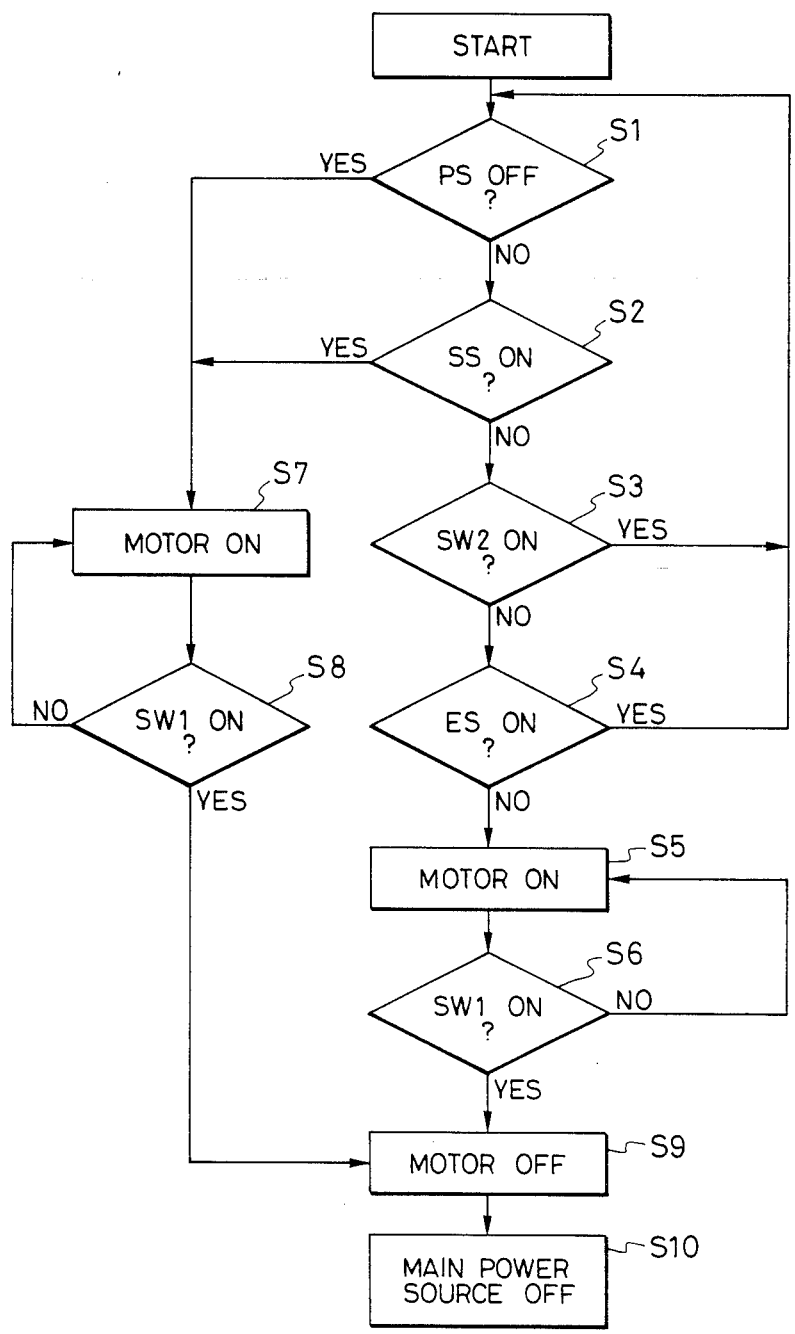
FIG. 6 shows a control operation of the drive control circuit shown in FIG. 5.

FIG. 6 is a flow chart showing a control operation of the microcomputer 200 which will be described with reference to FIG. 7.

In FIG. 6, the microcomputer 200 checks in step S1 whether or not the power switch PS is closed, i.e., whether or not the power source 70 is disconnected from the DAT device. When the switch PS is closed and power source 70 is connected in circuit, then it is determined in step S2 whether or not the stop switch SS is closed to stop the operation of the DAT device. If the switch SS is opened indicating that the operation of the device is not stopped, then it is checked in step S3 whether or not the switch SW1 is closed. If it is not closed, it is then checked in step S4 whether or not the ejection switch ES is closed to move the cassette to the ejection position i. When the switch ES is not closed, the motor M is energized in steps S5 and S6 until the cassette is moved to the unloaded position and the switch SW1 is closed.

If it is decided in the step S6 that switch SW1 is turned on, the motor M is deenergized in step S9 and the main power source is cut off in step S10.

If the check in step S1 shows that the power source is not connected in circuit or the check in step S2 shows that the switch SS is turned on, the motor M is energized in steps S7 and S8 until the switch SW1 is closed. If the check in step S8 shows that the switch SW1 is closed, the motor M is stopped in step S9 and the main power supply is cut off.

Describing the above control operation with reference to the waveforms showwn in FIG. 7, when the switches PS, SS, SW1, SW2 and ES are not closed and provide low level signals a, b, c, d and e, respectively, the microcomputer 200 provides high level control signals f and i. The high level control signal f is amplified by the power amplifier 201 and an output signal g thereof is supplied to the motor M to drive the latter to move the cassette 10 toward the unloaded position ii as shown in time period A.

When the ejection switch ES is closed under these conditions, the microcomputer 200 provides low level control signals f and i to allow the cassette 10 to move to the ejection position i as shown in time period B. On the other hand, when only the switch SW2 is closed showing that the cassette 10 is in the loaded position iii, the microcomputer 200 provides high level control signals f and i upon which the cassette is moved to the unloaded position ii, as shown in time period C.

When only the switch SW1 is closed showing that the cassette is in the unloaded position ii, the control signals f and i become low and thus the cassette is held in the unloaded position as it is, as shown in time period D.

When the switch SW1 is closed while the stop switch SS and the power switch PS are closed, indicating that the operation of the DAT is stopped with the cassette being held in the unloaded position, the control signals f and i are kept in a low level to leave the cassette as it is, as shown in time period E.

When the switch SW2 is closed under the same conditions, indicating that the cassette is in the loaded position iii, the levels of the control signals from the microcomputer 200 become high upon which the cassette is moved from the loaded position iii to the unloaded position ii, as shown in time period F.

When the stop switch SS is closed while the power switch PS is closed, the levels of the control signals from the microcomputer 200 become high to move the cassette to the unloaded position, as shown in time period G.

When the ejection switch ES is closed while the power switch PS is closed, the levels of the control signals f and i become low to allow the cassette to move to the ejection position i, as shown in time period H.

When neither the switch SS, SW1, SW2 nor ES is closed while the power switch PS is closed, the levels of the control signals f and i become high to move the cassette to the unloaded position, as shown in time period I, and, when thw switch SW2 is closed while the power switch PS is closed, the control signal levels become low, as shown in time period J.

In summary, the signals f and i are at a high level in the periods A and I in which the stop switch SS is open while the ejection operation continues. In the periods B and H, the motor M is not driven since the cassette is or to be in the ejection position. In the period C in which the cassette is left in the loaded position, the motor M is driven such that the cassette is moved therefrom to the unloaded position.

In the periods D and E in which the cassette is in the unloaded position, the motor M is not driven regardless of the conditions of the power switch PS and the stop switch SS. In the periods F and G in which the cassette is in the loaded position and/or the stop switch SS is closed, the cassette is moved to the unloaded position and, in the period H, the cassette is not driven since the cassette is in the ejection position and the operation of the device is stopped. In the period J in which the operation of the device is performed with the cassette being in the loaded position, the motor M is not actuated.

Since the closure of the switch SW1 is achieved when the cassette is driven by the motor M and reaches the unloaded position, the motor M is stopped to operate and the main power source is cut off after the swtich SW1 is closed.

Thus, in the case where the operation of the DAT device is stopped with the cassette being in the loaded position, the cassette is moved automatically to the unloaded position where the lid of the cassette is kept closed contrary to the loaded position and the slot cover of the device is also kept closed contrary to the ejection position. Therefore, the entry of dust into the DAT device as well as the cassette is effectively prevented. Further, since the magnetic tape itself is kept tight in the cassette, the tension on the tape is kept unchanged regardless of vibration of the DAT device and, thus, the problems of tape damage and/or tape tangling and adhesion to the rotary drum which are inherent to the conventional device are eliminated.

Further, since the unloaded position is closer to the loaded position than to the ejection position, the return of the cassette from the unloaded position to the loaded position is facilitated.

Figure 8:
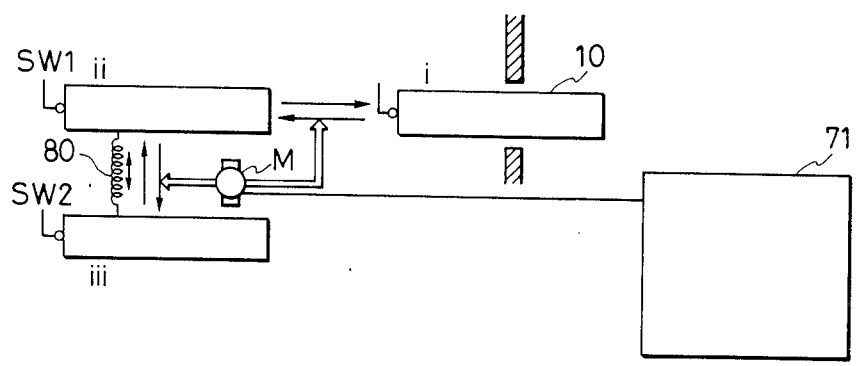
FIG. 8 is another embodiment of the present invention.

Although it is shown in the described embodiment that the movements of the cassette between the unloaded position and the loaded position and between the unloaded position and the ejection position are performed by means of the motor M, it is possible to use a mechanical force produced by such as a spring 80 in order to move the cassette from the loaded position to the unloaded position when the power source 71 is cut off as shown in FIG. 8. In the latter case, the backup power source to be used to shift the cassette from the loaded position to the unloaded position when the main power source fails may be omitted and, instead thereof, a mechanism for holding the cassette in the loaded position when the DAT device is to be operated and another mechanism for releasing a holding function thereof when the cassette should be moved to the unloaded position may be required.

Although the present invention has been described with reference to the DAT device, it is also applicable to other devices such as a VTR employing the slot-in cassette loading system.

The mechanism for realizing the movements of the cassette between these positions by means of the motor M can take any one of a number of forms which are known to and understood by those skilled in the art, and therefore, the details thereof have only been disclosed in a schematic fashion.

What is claimed is:

1. A rotary head type digital recording and reproducing device for use with a tape cassette (10) which is inserted thereinto through a slot (20) formed in said device and in which said cassette is selectively disposed in any one of an ejection position (i) where a lid (104) of said cassette is closed while a cover (40) of said slot is open, an unloaded position (ii) where both said cover and said lid are closed, and a loaded position (iii) where said lid is open to perform a recording or reproducing operation, comprising: detection means for detecting a termination of a recording or reproducing operation while said cassette is disposed in said loaded position and for producing an output signal in response thereto, and drive means responsive to an output signal from said detection means for moving said cassette from said loaded position to said unloaded position to prevent dust from entering the cassette through the lid thereof.

2. The rotary head type digital recording and reproducing device as claimed in claim 1, wherein said detection means detects a condition whereat a power supply to said device is terminated while said device continues to operate.

3. The rotary head type digital recording and reproducing device as claimed in claim 1, wherein said detection means detects a condition whereat the operation of said device is terminated while a power supply thereto continues.

4. The rotary head type digital recording and reproducing device as claimed in claim 2 or 3, wherein said drive means comprises a control means and an electric motor (M) for driving said cassette under a control of said control means, said control means comprising a microcomputer (200).

* * * * *